(12) United States Patent
Matsumura et al.

(10) Patent No.: US 9,334,821 B2
(45) Date of Patent: May 10, 2016

(54) FUEL INJECTION CONTROL APPARATUS FOR ENGINE

(71) Applicant: MITSUBISHI JIDOSHA KOGYO KABUSHIKI KAISHA, Tokyo (JP)

(72) Inventors: Wataru Matsumura, Okazaki (JP);
Toshiyuki Miyata, Okazaki (JP);
Katsunori Ueda, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/581,534

(22) Filed: Dec. 23, 2014

(65) Prior Publication Data

US 2015/0184605 A1     Jul. 2, 2015

(30) Foreign Application Priority Data

Dec. 26, 2013   (JP) ................................ 2013-269413

(51) Int. Cl.
*F01N 3/10* (2006.01)
*F02D 41/06* (2006.01)
(Continued)

(52) U.S. Cl.
CPC .......... *F02D 41/062* (2013.01); *F02D 41/0295* (2013.01); *F02D 41/061* (2013.01); *F02D 41/065* (2013.01); *F02D 41/126* (2013.01); *F01N 3/101* (2013.01); *F01N 11/005* (2013.01); *F01N 11/007* (2013.01); *F01N 2430/06* (2013.01); *F01N 2550/02* (2013.01); *F01N 2560/025* (2013.01); *F01N 2900/0418* (2013.01); *F01N 2900/0421* (2013.01); *F01N 2900/0422* (2013.01);
(Continued)

(58) Field of Classification Search
CPC ......... F01N 3/10; F01N 3/101; F01N 11/005; F01N 11/007; F01N 2430/06; F01N 2550/02; F01N 2560/025; F01N 2900/0418; F01N 2900/0421; F01N 2900/0422; F01N 2900/0601; F01N 2900/1402; F01N 2900/1602; F01N 2900/1626; F02D 41/061; F02D 41/065; F02D 41/126; F02D 41/1454; F02D 2200/0804; F02D 2200/0814; F02D 2250/36; Y02T 10/44; Y02Y 10/48
USPC .................. 60/276, 277, 285, 299; 180/65.21
See application file for complete search history.

(56) References Cited

U.S. PATENT DOCUMENTS

2007/0266696 A1* 11/2007 Kawakita .................. F01N 1/02
60/276
2010/0256894 A1* 10/2010 Yasui .................. F02D 41/0235
701/108

FOREIGN PATENT DOCUMENTS

JP        05-141293 A    6/1993
JP        2006-118433 A  5/2006

*Primary Examiner* — Thomas Denion
*Assistant Examiner* — Jorge Leon, Jr.
(74) *Attorney, Agent, or Firm* — Birch, Stewart, Kolasch & Birch, LLP

(57) ABSTRACT

A fuel injection control apparatus for an engine, which makes an appropriate increasing correction to a fuel amount at the time of restart after the stop period of the engine, thereby making it possible to cut down on the amounts of NOx emissions, is provided. The fuel injection control apparatus comprises an injection volume control unit for controlling a fuel injection volume, a supplied oxygen amount detection unit for detecting a supplied oxygen amount, an activity determination unit for determining whether or not an exhaust purification catalyst is in an active state, and an amount increasing correction unit for making an increasing correction to the fuel injection volume in accordance with the detection results of the supplied oxygen amount detection unit and the determination results of the activity determination unit.

20 Claims, 4 Drawing Sheets

(51) Int. Cl.
*F02D 41/12* (2006.01)
*F02D 41/02* (2006.01)
*F01N 11/00* (2006.01)
*F02D 41/14* (2006.01)
*F02N 11/08* (2006.01)

(52) U.S. Cl.
CPC ............ *F01N 2900/0601* (2013.01); *F01N 2900/1402* (2013.01); *F01N 2900/1626* (2013.01); *F02D 41/1454* (2013.01); *F02D 2200/0802* (2013.01); *F02D 2200/0814* (2013.01); *F02N 11/0814* (2013.01); *Y02T 10/44* (2013.01); *Y02T 10/48* (2013.01)

FUEL INJECTION CONTROL APPARATUS FOR ENGINE

The entire disclosure of Japanese Patent Application No. 2013-269413 filed on Dec. 26, 2013 is expressly incorporated by reference herein.

TECHNICAL FIELD

This invention relates to a fuel injection control apparatus for an engine, which adjusts, as appropriate, a fuel injection volume in accordance with the state of an exhaust purification catalyst provided in an engine.

BACKGROUND ART

So far, an exhaust passage of an engine loaded on a vehicle has been provided with an exhaust purification catalyst, such as a three-way catalyst, with the aim of purifying substances to be discharged in association with combustion, for example, HC (hydrocarbons), CO (carbon monoxide), and NOx (nitrogen oxides). This exhaust purification catalyst has the functions of absorbing oxygen ($O_2$) when in a lean atmosphere (oxidizing atmosphere) to accelerate the reduction reaction of NOx, and releasing the absorbed $O_2$ when in a rich atmosphere (reducing atmosphere) to accelerate the oxidation reaction of HC, CO or the like.

From the points of view of decreasing fuel consumption in the engine or protecting the exhaust purification catalyst, fuel supply is stopped (so-called fuel cut) while a vehicle is traveling, for example, when the vehicle is decelerating. During such fuel cut, substantially air alone is discharged into the exhaust passage, so that a large amount of oxygen is supplied to the exhaust purification catalyst and absorbed thereby. If fuel supply is restored (fuel restoration) in this state, NOx cannot be reductively treated sufficiently by the exhaust purification catalyst, with the result that an exhaust gas containing large amounts of NOx is likely to be emitted into the atmosphere.

To solve such problems, there are, for example, known technologies which, when fuel supply is restored, exercise control for temporarily making a fuel amount increasing correction in accordance with the length of the period of fuel cut to bring the air-fuel ratio to a rich side as compared with a stoichiometric air-fuel ratio (enrichment control) (see, for example, Patent Documents 1 and 2). These technologies can desorb oxygen stored in the exhaust purification catalyst ($O_2$ purge) and cut down on the amounts of NOx emissions into the atmosphere.

PRIOR ART DOCUMENTS

Patent Documents

[Patent Document 1] JP-A-2006-118433
[Patent Document 2] JP-A-5-141293

SUMMARY OF THE INVENTION

Problems to be Solved by the Invention

In recent years, hybrid vehicles with an engine and a motor as a drive source have found practical use. In some of the hybrid vehicles, a travel mode is automatically switched, depending on the traveling state of the vehicle, between a first travel mode in which the vehicle travels with the engine and the motor being driven, and a second travel mode in which the vehicle travels with only the motor being driven.

In such vehicles, when the travel mode is switched from the first travel mode to the second travel mode, namely, when the engine is stopped during travel, there arises a period during which the engine rotates through inertia with fuel supply being stopped (fuel cut period).

During this fuel cut period as well, it is likely for an exhaust gas containing large amounts of NOx to be emitted into the atmosphere, as described earlier. Thus, when the second travel mode is switched to the first travel mode, too, it is effective to make a fuel amount increasing correction.

With the hybrid vehicle, however, there may be a case in which the period of engine stop, concretely, the period of travel in the second travel mode, is relatively long. During this period, the exhaust purification catalyst lowers in temperature, and falls into an inactive state, whereby oxygen stored in the exhaust purification catalyst is desorbed. If, in such a state, fuel supply is restored and, on this occasion, a fuel amount increasing correction is made in accordance with the length of the fuel cut period, then there will be an excess of fuel, which is not preferred.

The present invention has been accomplished in the light of the above-described circumstances. It is an object of this invention to provide a fuel injection control apparatus for an engine which makes an appropriate increasing correction to a fuel amount at the time of restart after the stop period of the engine, thereby making it possible to cut down on the amounts of NOx emissions.

Means for Solving the Problems

A first aspect of the present invention for solving the above problems is a fuel injection control apparatus for an engine equipped with an exhaust purification catalyst in an exhaust passage, comprising: an injection volume control unit for controlling a fuel injection volume injected from a fuel injection valve; a supplied oxygen amount detection unit for detecting a supplied oxygen amount supplied to the exhaust purification catalyst during a period from cessation of fuel injection by the fuel injection valve until stoppage of the engine; an activity determination unit for determining whether or not the exhaust purification catalyst is in an active state, at a time of restart of the engine; and an amount increasing correction unit for making an amount increasing correction to the fuel injection volume injected from the fuel injection valve at the time of restart of the engine, in accordance with detection results of the supplied oxygen amount detection unit and determination results of the activity determination unit.

A second aspect of the present invention is the fuel injection control apparatus for an engine according to the first aspect, wherein the supplied oxygen amount detection unit estimates the supplied oxygen amount based on a duration of fuel cut executed at a time of stoppage of the engine.

A third aspect of the present invention is the fuel injection control apparatus for an engine according to the first or second aspect, wherein the supplied oxygen amount detection unit estimates the supplied oxygen amount based on an output value of a downstream-side air-fuel ratio detection device provided downstream of the exhaust purification catalyst.

A fourth aspect of the present invention is the fuel injection control apparatus for an engine according to any one of the first to third aspects, wherein the activity determination unit determines whether or not the exhaust purification catalyst is in the active state, based on a stop period of the engine.

A fifth aspect of the present invention is the fuel injection control apparatus for an engine according to any one of the first to fourth aspects, wherein the amount increasing correction unit sets, for the amount increasing correction, an amount increasing correction factor in accordance with the detection results of the supplied oxygen amount detection unit and the determination results of the activity determination unit; and the injection volume control unit allows fuel to be injected from the fuel injection valve based on the amount increasing correction factor.

A sixth aspect of the present invention is the fuel injection control apparatus for an engine according to any one of the first to fifth aspects, wherein the amount increasing correction unit terminates the amount increasing correction when an air-fuel ratio of the exhaust purification catalyst comes to a rich side as compared with a predetermined value.

A seventh aspect of the present invention is the fuel injection control apparatus for an engine according to the sixth aspect, wherein the amount increasing correction unit determines whether or not the air-fuel ratio of the exhaust purification catalyst is on the rich side as compared with the predetermined value, based on an output value of a downstream-side air-fuel ratio detection device provided downstream of the exhaust purification catalyst.

Effects of the Invention

With the present invention, at the time of restart after the stop period of the engine, fuel can be appropriately increased in amount to carry out oxygen purge of the exhaust purification catalyst. Even at the time of engine restart, therefore, NOx can be subjected to sufficient reduction in the exhaust purification catalyst to cut down on the amounts of NOx emissions into the atmosphere.

MODE FOR CARRYING OUT THE INVENTION

An embodiment of the present invention will now be described in detail with reference to the accompanying drawings.

Figure 1:
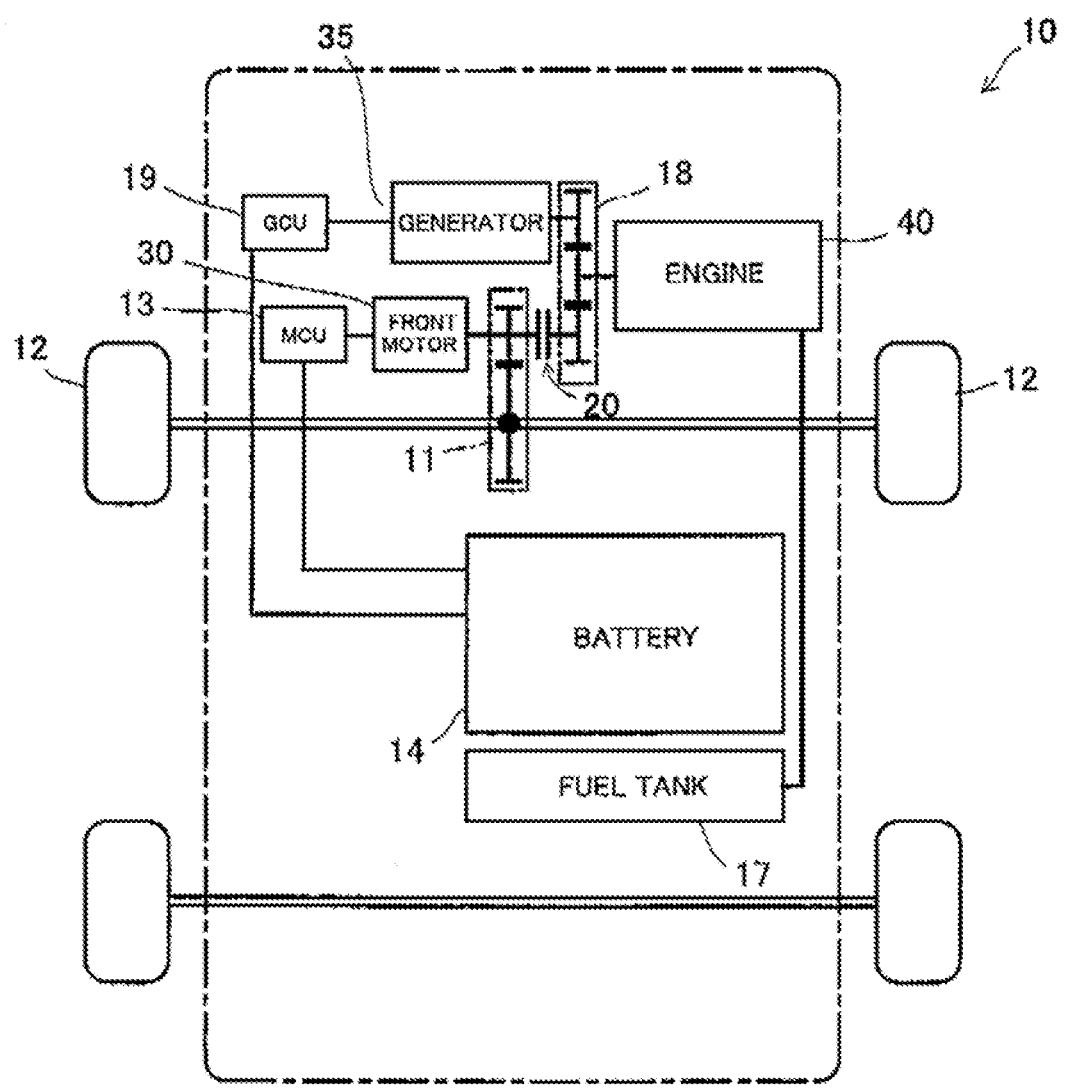
[FIG. 1] is a schematic view showing the entire configuration of a hybrid vehicle which is an example of a vehicle.

First of all, an explanation will be offered for an example of a vehicle equipped with a fuel injection device for an engine according to the present embodiment. As shown in FIG. 1, a vehicle 10 according to the present embodiment is a hybrid car having, as a drive source for traveling, a front motor 30, which is a traction motor, and an engine 40. The driving force of the front motor 30 is transmitted to front wheels 12 via a front power transmission mechanism 11. To the front motor 30, a battery 14 is connected via a motor control unit (MCU) 13.

The engine 40 is driven by combustion of fuel supplied from a fuel tank 17. The engine 40 is connected to a generator 35 via an output system 18. The generator 35 is connected to the battery 14 via a generator control unit (GCU) 19. The output system 18 is connected to the generator 35, and also connected to the front power transmission mechanism 11 via a clutch 20.

Figure 2:
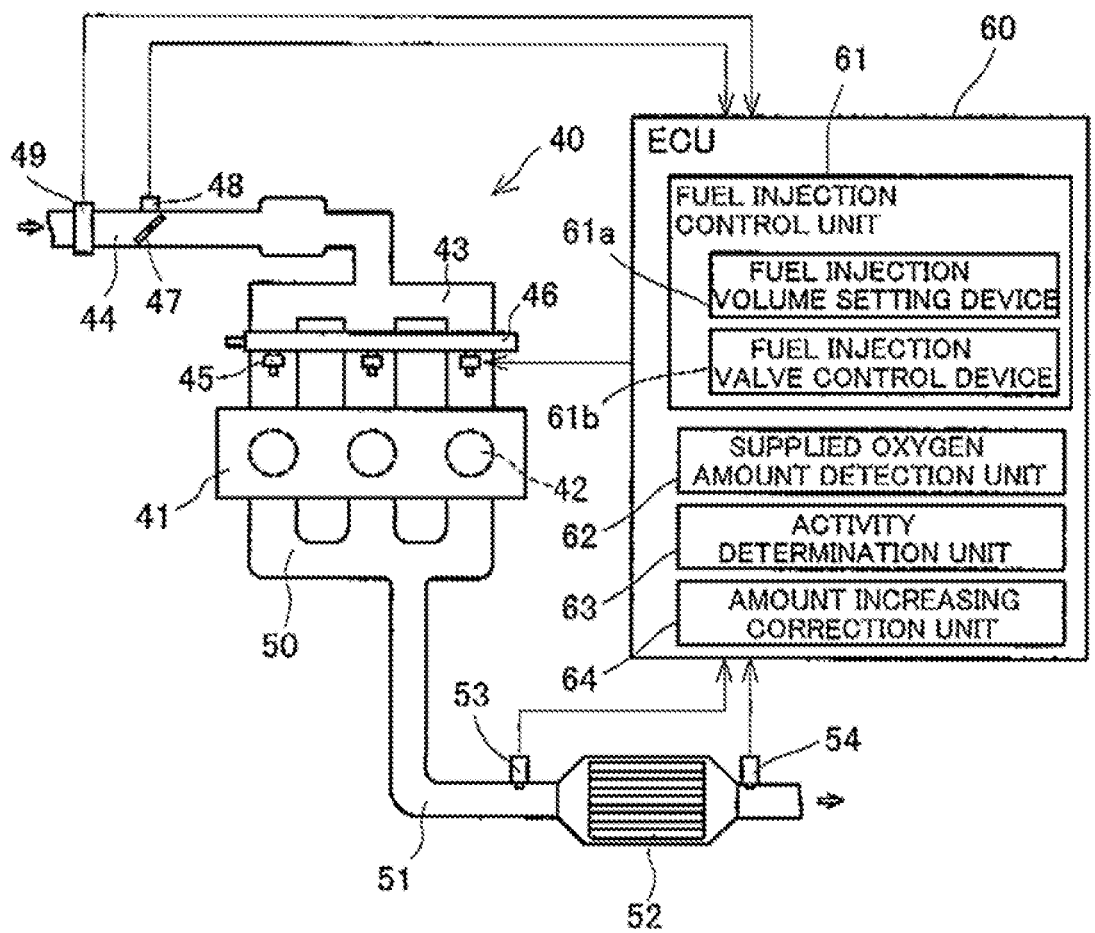
[FIG. 2] is a view showing the schematic configuration of an engine and a fuel injection control device therefor according to the present invention.

As shown in FIG. 2, the engine 40 is, for example, a manifold fuel injection type multi-cylinder engine, and a cylinder head 41 constituting the engine 40 has a plurality of (for example, three) cylinders 42 installed in parallel. In each cylinder (combustion chamber) 42, an ignition plug is disposed, and an intake port and an exhaust port are provided, although they are not illustrated.

An intake manifold 43 is connected to the intake ports of the cylinder head 41, and an intake pipe 44 is connected to the intake manifold 43. The intake manifold 43 is provided with a plurality of fuel injection valves 45 corresponding to the respective cylinders 42. These fuel injection valves 45 are connected to the fuel tank (not shown) via a delivery pipe 46, and fuel supplied from the fuel tank is injected, as appropriate, into the intake manifold 43 or the respective cylinders 42 by the fuel injection valves 45. The intake pipe (intake passage) 44 is provided with a throttle valve 47 for adjusting the amount of intake air, and a throttle position sensor (TPS) 48 for detecting the opening degree of the throttle valve 47. Further, a section of the intake pipe 44 upstream of the throttle valve 47 is provided with an air flow sensor 49 for detecting the flow rate of intake air.

An exhaust manifold 50 is connected to the exhaust ports of the cylinder head 41, and an exhaust pipe (exhaust passage) 51 is connected to the exhaust manifold 50. A three-way catalyst 52 as an exhaust purification catalyst is interposed in the exhaust pipe 51.

The three-way catalyst 52, for example, has at least one of precious metals, including copper (Cu), cobalt (Co), silver (Ag), platinum (Pt), rhodium (Rh) and palladium (Pd), borne on a carrier. Alternatively, the three-way catalyst 52 has, as a cocatalyst, at least one of cerium (Ce) and zirconium (Zr) having an oxygen-absorbing function ($O_2$ storage function). Such a type of cocatalyst has the following properties: Upon capture (storage: adsorption, absorption or the like) of oxygen ($O_2$) in a high oxygen concentration atmosphere (oxidizing atmosphere) whose exhaust air-fuel ratio (exhaust A/F) is a lean air-fuel ratio (lean A/F), the cocatalyst holds the captured $O_2$ (storage $O_2$) in a dissociated O state until the exhaust A/F turns into a rich air-fuel ratio (rich A/F) to achieve a low oxygen concentration atmosphere (reducing atmosphere); in the reducing atmosphere, the cocatalyst desorbs the dissociated O, and releases it. The cocatalyst also has the function of temporarily trapping oxides such as NOx and SOx.

In a section of the exhaust pipe 51 upstream of the three-way catalyst 52, a linear air-fuel ratio sensor (LAFS) 53 is provided. The LAFS 53 detects the exhaust A/F, and feedback control in a steady operation is exercised based on its detection results. A front $O_2$ sensor for detecting the oxygen concentration of the exhaust can be used instead of the LAFS 53.

In a section of the exhaust pipe 51 downstream of the three-way catalyst 52, a rear $O_2$ sensor 54 as a downstream-side air-fuel ratio detection device is provided. The rear $O_2$ sensor 54 detects the $O_2$ concentration in the exhaust having passed through the three-way catalyst 52.

An ECU (electronic control unit) 60 is equipped with an input-output device, a storage device (ROM, RAM or the like), a central processing unit (CPU), a timer, and counters. The ECU 60 exercises integrated control over the engine 40. To the input side of the ECU 60, there are connected the above-mentioned throttle position sensor (TPS) 48, air flow sensor 49, LAFS 53 and rear $O_2$ sensor 54, and various sensors such as a crank angle sensor and a water temperature sensor, although they are not illustrated. Detection information from these sensors is entered into the ECU 60.

To the output side of the ECU 60, various output devices such as the aforementioned fuel injection valves 45, throttle valve 47 and an ignition coil (not shown) are connected. These various output devices are controlled, as appropriate, by the ECU 60 based on the detection information from the aforementioned various sensors. For example, a fuel injection volume injected from the fuel injection valve 45 is also controlled, as appropriate, by the ECU 60 based on the detection information from the aforementioned various sensors. That is, the fuel injection control apparatus for an engine according to the present invention is composed of the ECU 60 and the various sensors. As will be described below, the fuel injection control apparatus makes a fuel amount increasing correction at the time of restart after the stop period of the engine 40 to control the fuel injection volume from the fuel injection valve 45 appropriately.

As shown in FIG. 2, the ECU 60 includes a fuel injection control unit 61, a supplied oxygen amount detection unit 62, an activity determination unit 63, and an amount increasing correction unit 64.

The fuel injection control unit 61 controls the fuel injection volume to be injected from the fuel injection valve 45, based on the traveling state, e.g., travel mode, of the vehicle 10.

The vehicle 10 concerned with the present embodiment is adapted to switch between a first travel mode and a second travel mode, as appropriate, in accordance with a demand load or the like. The first travel mode is a mode in which the vehicle travels by driving both the front motor 30 and the engine 40. Concrete examples of the first travel mode are a series travel mode in which the engine 40 is driven for use as a power supply source for the front motor 30, and a parallel travel mode in which the wheels of the vehicle are driven by the driving force of both of the front motor 30 and the engine 40. The second travel mode, on the other hand, is an EV travel mode in which only the front motor 30 is driven. That is, with the second travel mode (EV travel mode), fuel supply to the engine 40 is stopped (fuel cut), and the vehicle 10 is allowed to run only by the driving force of the front motor 30, with the engine 40 being stopped.

The fuel injection control unit 61 adjusts, as appropriate, the fuel injection volume from the fuel injection valve 45 in conformity with each such travel mode. In the present embodiment, the fuel injection control unit 61 has a fuel injection volume setting device 61a and a fuel injection valve control device 61b. The fuel injection volume setting device 61a sets a target fuel injection volume in accordance with the traveling state (e.g., travel mode) of the vehicle 10. The fuel injection valve control device 61b controls, as appropriate, the valve opening time of the fuel injection valve 45 such that the target fuel injection volume set by the fuel injection volume setting device 61a is injected.

When the travel mode of the vehicle 10 is switched from the first travel mode (e.g., series travel mode) to the EV travel mode which is the second travel mode, for example, the fuel injection control unit 61 carries out fuel cut at a predetermined timing. That is, the fuel injection volume setting device 61a sets the target fuel injection volume at zero at the predetermined timing and, in accordance with this action, the fuel injection valve control device 61b holds the fuel injection valve 45 in a closed state to cut off fuel supply to the engine 40 (fuel cut).

When this fuel cut is effected, the engine 40 rotates for a while by inertia (fuel cut period), and then the engine 40 stops completely. As a result, the travel mode shifts from the series travel mode to the EV travel mode (engine stall mode). The above engine cut period varies, as appropriate, according to the traveling state of the vehicle 10, e.g., vehicle speed, at the time of starting the fuel cut.

The supplied oxygen amount detection unit 62 detects the amount of oxygen supplied to the three-way catalyst 52, which is the exhaust purification catalyst, during a period from cessation of fuel injection by the fuel injection valve 45 until stoppage of the engine 40. In other words, the supplied oxygen amount detection unit 62 detects the supplied oxygen amount supplied to the three-way catalyst 52 during the fuel cut period, when fuel cut is executed to stop the engine 40, for example, when the travel mode of the vehicle 10 is switched from the series travel mode to the EV travel mode. Concretely, the supplied oxygen amount detection unit 62 estimates the supplied oxygen amount based on the length of the fuel cut period. In the present embodiment, whether or not the supplied oxygen amount is equal to or more than a predetermined amount is estimated based on the length of the fuel cut period. For example, if the length of the fuel cut period is equal to or more than a predetermined period, the amount of oxygen supplied to the three-way catalyst 52 is estimated to be the predetermined amount or more.

The three-way catalyst 52 is supplied with a large amount of oxygen ($O_2$) during the fuel cut period which the engine 40 rotates by inertia, and the oxygen is absorbed by the three-way catalyst 52. Thus, as the length of the fuel cut period is extended, the supplied oxygen amount supplied to the three-way catalyst 52 is increased. Thus, the supplied oxygen amount can be estimated relatively accurately by estimating the supplied oxygen amount based on the fuel cut period.

The oxygen stored in the three-way catalyst 52 is saturated when the supplied oxygen amount exceeds the predetermined amount. In the present embodiment, therefore, the supplied oxygen amount detection unit 62 detects (estimates) whether or not the supplied oxygen amount is equal to or more than the predetermined amount, as stated above.

In the present embodiment, the supplied oxygen amount detection unit 62 is adapted to estimate the supplied oxygen amount based on the fuel cut period, but may be configured to estimate the supplied oxygen amount based on the detection results of the rear $O_2$ sensor 54. For example, if the detection value of the rear $O_2$ sensor 54 is lower than a predetermined value, namely, if the exhaust air-fuel ratio of the three-way catalyst 52 is lean, the amount of oxygen supplied to the three-way catalyst 52 may be estimated to be the predetermined amount or more. It goes without saying that the supplied oxygen amount may be estimated based on the detection results of the rear $O_2$ sensor 54 as well as the length of the fuel cut period. By so doing, the supplied oxygen amount can be estimated with further accuracy.

The activity determination unit 63 determines whether or not the three-way catalyst 52, which is the exhaust purification catalyst, is in an active stats at the time of restart of the engine 40. That is, the activity determination unit 63 determines whether or not the active state of the three-way catalyst 52 is maintained, at the time of restart of the engine 40.

Here, the time of restart of the engine 40, in the present embodiment, refers to the timing at which after the travel mode of the engine 40 is switched from the first travel mode (series travel mode) to the second travel mode (EV travel mode), the travel mode is switched again to the first travel mode (series travel mode). When the travel mode is switched from the EV travel mode to the series travel mode, the activity determination unit 63 determines whether or not the three-way catalyst 52 is in an active state, based on the duration of the EV travel mode (engine stall mode), namely, the period during which the engine 40 keeps stopped after the fuel cut period.

The three-way catalyst 52 is in an active state, as long as its temperature is equal to or higher than a predetermined temperature. Moreover, the temperature of the three-way catalyst 52 becomes lower as the stop period of the engine 40 lengthens. With the activity determination unit 63, therefore, if the stop period of the engine 40 (duration of the EV travel mode) is equal to or shorter than a predetermined period, it is determined that the three-way catalyst 52 is active; if the stop period of the engine 40 is longer than the predetermined period, it is determined that the three-way catalyst 52 is not active. By this procedure, whether or not there is need for a fuel amount increasing correction at the time of a next start can be determined reliably, and fuel economy can be prevented from becoming poor because of a wasteful fuel amount increasing correction.

In the present embodiment, the activity determination unit 63 determines the active state of the three-way catalyst 52 based on the length of the stop period of the engine 40. However, the activity determination unit 63, needless to say, can detect the temperature of the three-way catalyst 52 by relying on a temperature sensor or the like, and determine the active state based on the results of detection. It is also permissible to estimate the temperature of the three-way catalyst 52, for example, from the cooling water temperature of the engine 40, without using a temperature sensor or the like.

The amount increasing correction unit 54 makes a correction so as to increase the fuel injection volume injected from the fuel injection valve 45 at the time of restart of the engine 40, in accordance with the results of detection by the supplied oxygen amount detection unit 62 and the results of determination by the activity determination unit 63.

Concretely, the amount increasing correction unit 64 executes "amount increasing correction" when the supplied oxygen amount detection unit 62 detects (estimates) that the supplied oxygen amount supplied to the three-way catalyst 52 is equal to or more than the predetermined amount, and the activity determination unit 63 determines that the three-way catalyst 52 is in an active state. In the present embodiment, the amount increasing correction unit 64 sets an amount increasing correction factor (enrichment factor) for the above "amount increasing correction". This amount increasing correction factor may be set, as appropriate. For example, it may be set at a higher value when the supplied oxygen amount is larger, or may be set at a constant value no matter what the supplied oxygen amount is.

The fuel injection control unit 61 allows fuel to be injected from the fuel injection valve 45, based on the amount increasing correction factor set by the amount increasing correction unit 64. That is, the target fuel injection volume set by the fuel injection volume setting device 61a is corrected based on the amount increasing correction factor, and the fuel injection valve control device 61b controls the action (valve opening time) of the fuel injection valve 45 such that the corrected target fuel injection volume is achieved.

As described above, at the time of restart of the engine 40, the fuel injection volume injected from the fuel injection valve 45 is corrected, as appropriate, based on the amount increasing correction factor set by the amount increasing correction unit 64. Thus, oxygen trapped by the three-way catalyst 52 (trapped $O_2$) can be desorbed satisfactorily ($O_2$ purge), and the amounts of NOx emissions into the atmosphere can be effectively decreased. With the present invention, moreover, the active state of the three-way catalyst 52, which is the exhaust purification catalyst, is determined based on the stop period of the engine 40 and, based on the results of determination, an amount increasing correction is executed at the time of restart of the engine 40. Hence, an excessive increase in the fuel injection volume due to a routine amount increasing correction can be curbed.

The amount increasing correction unit 64 also terminates the amount increasing correction if the air-fuel ratio of the three-way catalyst 52 changes to the rich side as compared with the predetermined value. In the present embodiment, the amount increasing correction unit 64 determines whether or not the air-fuel ratio of the three-way catalyst 52 is on the rich side as compared with the predetermined value, based on the output value of the rear $O_2$ sensor 54 which is the downstream-side air-fuel ratio sensor. If the above air-fuel ratio is on the rich side, the amount increasing correction unit 64 terminates the amount increasing correction (returns the amount increasing correction factor to the initial value).

By so terminating the amount increasing correction based on the air-fuel ratio of the three-way catalyst 52, the amount increasing correction can be terminated at a more appropriate timing.

Next, an example of fuel injection control (amount increasing correction control) over the engine relevant to the present embodiment will be explained by reference to a time chart as FIG. 3 and a flow chart as FIG. 4.

Figure 3:
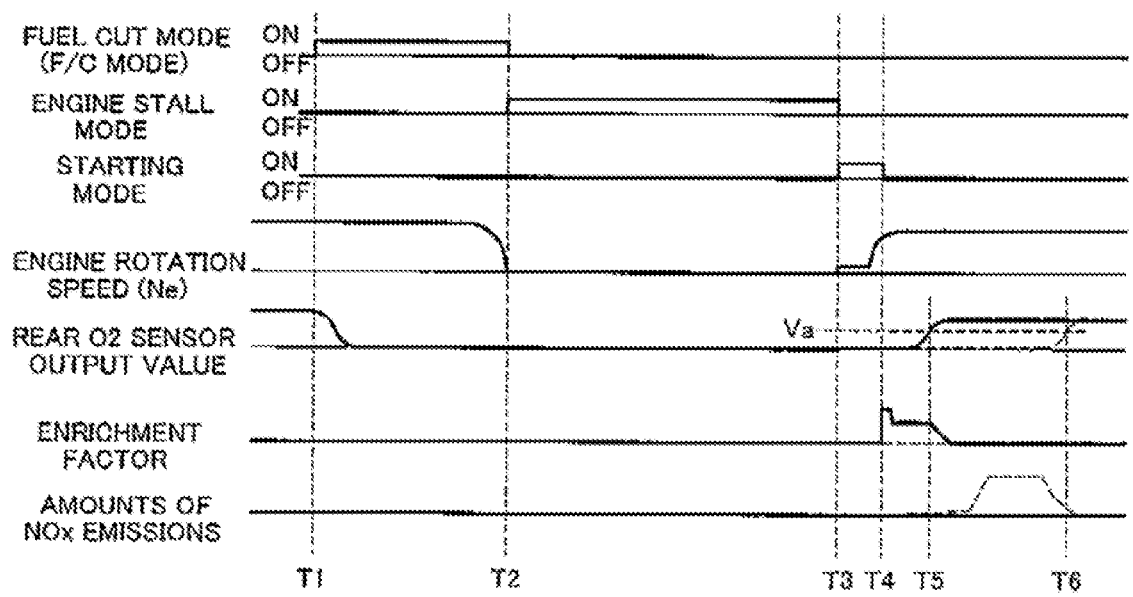
[FIG. 3] is a time chart illustrating the behaviors of various parameters involved in fuel amount increasing correction control according to an embodiment of the present invention.
Figure 4:
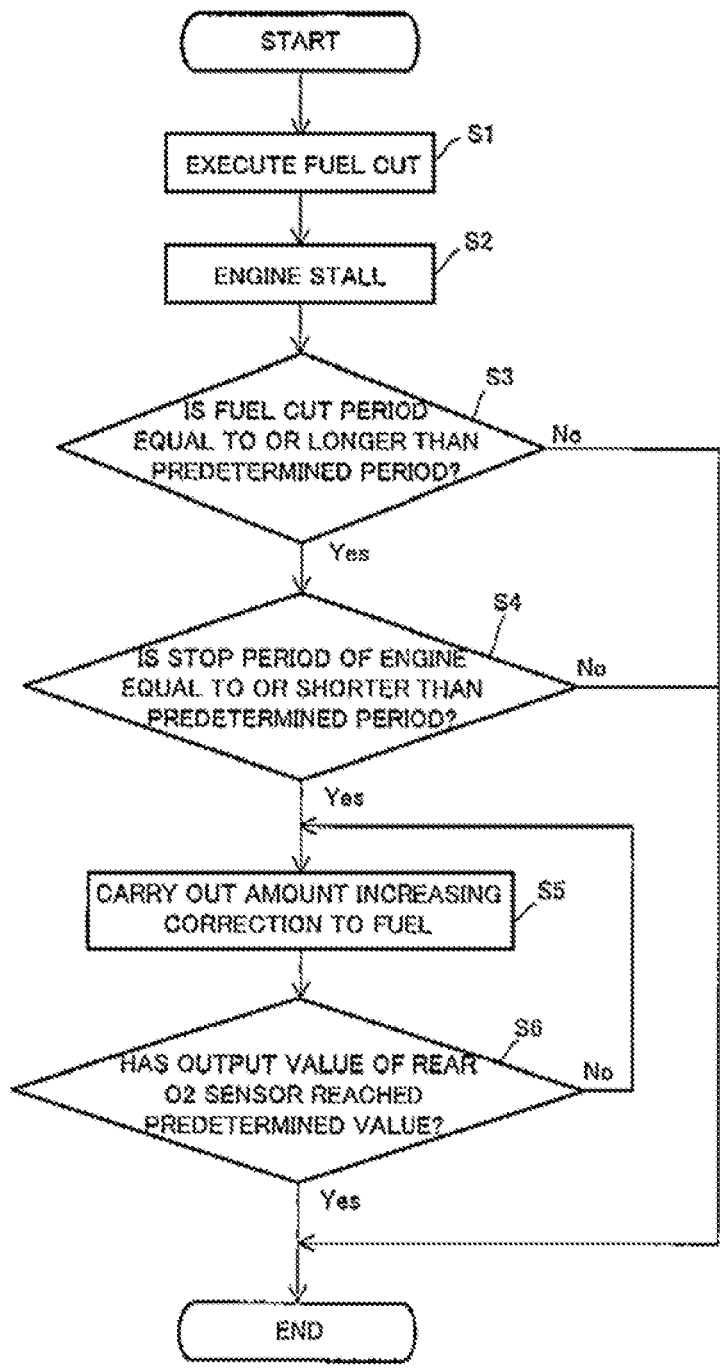
[FIG. 4] is a flow chart showing an example of the fuel amount increasing correction control according to the embodiment of the present invention.

As shown in FIGS. 3 and 4, when a fuel cut mode as a control mode for the engine 40 is selected (fuel cut is executed) at time T1 (Step S1), the engine 40 rotates for a while through inertia, whereafter the rotation speed (Ne) gradually lowers, and the engine 40 completely stops (stalls) at time T2. That is, at time T2 (Step S2), the travel mode of the vehicle shifts from the first travel mode (series travel mode) to the second travel mode (EV travel mode), and the control mode for the engine 40 shifts from the fuel cut mode to the engine stall mode. In this example, the output value (e.g., voltage value) of the rear $O_2$ sensor 54 lowers in a relative early stage after execution of the fuel cut at time T1. That is, the exhaust air-fuel ratio of the three-way catalyst 52 becomes lean in a relative early stage after execution of the fuel cut.

Then, at a timing of time T3, the travel mode of the vehicle 10 is switched from the second travel mode (EV travel mode) to the first travel mode (series travel mode) in accordance with a demand load or the like. At the same time, the control mode for the engine 40 shifts from the engine stall mode to a starting mode. Upon shift to the starting mode, cranking of the engine 40 is initiated. The starting mode is released at time T4 when the engine 40 reaches a predetermined engine speed (Ne), whereupon the vehicle enters an ordinary operation mode.

Simultaneously with the release of the starting mode at time T4, the aforementioned amount increasing correction to fuel is made as appropriate. In detail, in Step S3, it is determined whether the length of the fuel cut period (period from T1 to T2) is equal to or more than a predetermined period. If the fuel cut period is equal to or more than the predetermined period (step S3: Yes), it is further determined whether the length of the stop period of the engine 40 (period from T2 to T3) is equal to or less than a predetermined period. If the stop period of the engine 40 is espial to or less than the predetermined period (Step S4: Yes), a fuel amount increasing correction is made in Step S5 to increase an enrichment factor as indicated by a solid line in FIG. 3. By this treatment, the exhaust air-fuel ratio of the three-way catalyst 52 is enriched. That is, the output value of the rear $O_2$ sensor 54 is increased as indicated by a solid line in FIG. 3.

Then, if the output value of the rear $O_2$ sensor 54 reaches a predetermined value (e.g., predetermined voltage Va) at time T5 (Step S6) (Step S6:Yes), the enrichment factor is gradually decreased to terminate the amount increasing correction. In the present embodiment, the amount increasing correction is terminated at a point in time at which the exhaust air-fuel ratio of the three-way catalyst 52 comes to the rich side as compared with the stoichiometric air-fuel ratio. If the length of the fuel cut period is shorter than the predetermined period (Step S3: No), or if the stop period of the engine 40 is longer than the predetermined period (Step S4: No), a series of processings is terminated without execution of a fuel amount increasing correction.

In the present embodiment, as described above, when the travel mode of the vehicle 10 is switched from the second travel mode (EV travel mode) to the first travel mode (series travel mode) to restart the engine 40, fuel amount increasing control is exercised, as appropriate, based on the length of the fuel cut period and the length of the stop period of the engine 40. By this measure, the amounts of NOx emissions can be decreased effectively as indicated by a solid line in FIG. 3. In particular, fuel amount increasing control is effected based on the length of the stop period of the engine 40. Thus, the excessive increase in the fuel injection volume can also be curbed.

If a fuel amount increasing correction is not made, a considerable period of time is required until the exhaust air-fuel ratio of the three-way catalyst 52 is increased after restart of the engine 40 at time T3. That is, as indicated by a dashed line in FIG. 3, the output value of the rear $O_2$ sensor 54 reaches the predetermined value at time T6 which is later than time T5. During this period, the amounts of NOx emissions increase markedly as indicated by a dashed line in FIG. 3.

The present invention has been described above in regard to one embodiment thereof, but it is to be understood that the present invention is in no way limited to this embodiment.

In the above embodiment, for example, the explanations have been offered for the present invention, with an illustration of the hybrid vehicle equipped with the engine and the motor. Needless to say, however, the present invention can also be applied to a vehicle equipped with an engine alone. In recent years, some of vehicles, such as automobiles which run by the driving force of their engine, have adopted a technology called idling stop. The idling stop is a technology for stopping and starting the engine automatically in synchronism with vehicle stop and vehicle start. Another example of the idling stop technology comprises executing fuel cut before bringing a vehicle to a complete halt when stopping the vehicle. The present invention is also applicable to a vehicle adopting such an idling stop technology, and can obtain the same actions and effects as those in the case of the aforementioned hybrid vehicle.

In the above embodiment, the present invention has been explained using an illustration of the vehicle in which the engine 40 rotates through inertia by fuel cut. However, it is permissible, for example, to perform motoring of the engine 40 with the use of a generator 35, and make an amount increasing correction to the fuel injection volume at the time of a next start of the engine based on the fuel cut period on this occasion.

EXPLANATIONS OF LETTERS OR NUMERALS

10 Engine
11 Front power transmission mechanism
12 Front wheel
14 Battery
17 Fuel tank
18 Output system
20 Clutch
30 Front motor
35 Generator
40 Engine
41 Cylinder head
42 Cylinder
43 Intake manifold
44 Intake pipe
45 Fuel injection valve
46 Delivery pipe
47 Throttle valve
48 Throttle position sensor (TPS)
49 Air flow sensor
50 Exhaust manifold
51 Exhaust pipe
52 Three-way catalyst
53 Linear air-fuel ratio sensor (LAFS)
54 Rear $O_2$ sensor
61 Fuel injection control unit
61*a* Fuel injection volume setting device
61*b* Fuel injection valve control device
62 Supplied oxygen amount detection unit
63 Activity determination unit
64 Amount increasing correction unit

The invention claimed is:

1. A fuel injection control apparatus for an engine equipped with an exhaust purification catalyst in an exhaust passage, comprising:
   an injection volume control unit that controls a fuel injection volume injected from a fuel injection valve;
   a supplied oxygen amount detection unit that detects a supplied oxygen amount supplied to the exhaust purification catalyst during a period from cessation of fuel injection by the fuel injection valve until stoppage of the engine;
   an activity determination unit that determines whether or not the exhaust purification catalyst is in an active state, at a time of restart of the engine; and
   an amount increasing correction unit that makes an amount increasing correction to the fuel injection volume injected from the fuel injection valve at the time of restart of the engine, in accordance with detection results of the supplied oxygen amount detection unit and determination results of the activity determination unit.

2. The fuel injection control apparatus for an engine according to claim 1, wherein
   the supplied oxygen amount detection unit estimates the supplied oxygen amount based on a duration of fuel cut executed at a time of stoppage of the engine.

3. The fuel injection control apparatus for an engine according to claim 2, wherein
   the supplied oxygen amount detection unit estimates the supplied oxygen amount based on an output value of a downstream-side air-fuel ratio detection device provided downstream of the exhaust purification catalyst.

4. The fuel injection control apparatus for an engine according to claim 3, wherein
   the activity determination unit determines whether or not the exhaust purification catalyst is in the active state, based on a stop period of the engine.

5. The fuel injection control apparatus for an engine according to claim 4, wherein
   the amount increasing correction unit sets, for the amount increasing correction, an amount increasing correction factor in accordance with the detection results of the supplied oxygen amount detection unit and the determination results of the activity determination unit; and the injection volume control unit allows fuel to be injected from the fuel injection valve based on the amount increasing correction factor.

6. The fuel injection control apparatus for an engine according to claim 3, wherein
the amount increasing correction unit sets, for the amount increasing correction, an amount increasing correction factor in accordance with the detection results of the supplied oxygen amount detection unit and the determination results of the activity determination unit; and
the injection volume control unit allows fuel to be injected from the fuel injection valve based on the amount increasing correction factor.

7. The fuel injection control apparatus for an engine according to claim 2, wherein
the activity determination unit determines whether or not the exhaust purification catalyst is in the active state, based on a stop period of the engine.

8. The fuel injection control apparatus for an engine according to claim 7, wherein
the amount increasing correction unit sets, for the amount increasing correction, an amount increasing correction factor in accordance with the detection results of the supplied oxygen amount detection unit and the determination results of the activity determination unit; and
the injection volume control unit allows fuel to be injected from the fuel injection valve based on the amount increasing correction factor.

9. The fuel injection control apparatus for an engine according to claim 2, wherein
the amount increasing correction unit sets, for the amount increasing correction, an amount increasing correction factor in accordance with the detection results of the supplied oxygen amount detection unit and the determination results of the activity determination unit; and
the injection volume control unit allows fuel to be injected from the fuel injection valve baaed on the amount increasing correction factor.

10. The fuel injection control apparatus for an engine according to claim 2, wherein
the amount increasing correction unit terminates the amount increasing correction when an air-fuel ratio of the exhaust purification catalyst comes to a rich side as compared with a predetermined value.

11. The fuel injection control apparatus for an engine according to claim 1, wherein
the supplied oxygen amount detection unit estimates the supplied oxygen amount based on an output value of a downstream-side air-fuel ratio detection device provided downstream of the exhaust purification catalyst.

12. The fuel injection control apparatus for an engine according to claim 11, wherein
the activity determination unit determines whether or not the exhaust purification catalyst is in the active state, based on a stop period of the engine.

13. The fuel injection control apparatus for an engine according to claim 12, wherein
the amount increasing correction unit sets, for the amount increasing correction, an amount increasing correction factor in accordance with the detection results of the supplied oxygen amount detection unit and the determination results of the activity determination unit; and
the injection volume control unit allows fuel to be injected from the fuel injection valve based on the amount increasing correction factor.

14. The fuel injection control apparatus for an engine according to claim 11, wherein
the amount increasing correction unit sets, for the amount increasing correction, an amount increasing correction factor in accordance with the detection results of the supplied oxygen amount detection unit and the determination results of the activity determination unit; and
the injection volume control unit allows fuel to be injected from the fuel injection valve based on the amount increasing correction factor.

15. The fuel injection control apparatus for an engine according to claim 11, wherein
the amount increasing correction unit terminates the amount increasing correction when an air-fuel ratio of the exhaust purification catalyst comes to a rich side as compared with a predetermined value.

16. The fuel injection control apparatus for an engine according to claim 1, wherein
the activity determination unit determines whether or not the exhaust purification catalyst is in the active state, based on a stop period of the engine.

17. The fuel injection control apparatus for an engine according to claim 16, wherein
the amount increasing correction unit sets, for the amount increasing correction, an amount increasing correction factor in accordance with the detection results of the supplied oxygen amount detection unit and the determination results of the activity determination unit; and
the injection volume control unit allows fuel to be injected from the fuel injection valve based on the amount increasing correction factor.

18. The fuel injection control apparatus for an engine according to claim 1, wherein
the amount increasing correction unit sets, for the amount increasing correction, an amount increasing correction factor in accordance with the detection results of the supplied oxygen amount detection unit and the determination results of the activity determination unit; and
the injection volume control unit allows fuel to be injected from the fuel injection valve based on the amount increasing correction factor.

19. The fuel injection control apparatus for an engine according to claim 1, wherein
the amount increasing correction unit terminates the amount increasing correction when an air-fuel ratio of the exhaust purification catalyst comes to a rich side as compared with a predetermined value.

20. The fuel injection control apparatus for an engine according to claim 19, wherein
the amount increasing correction unit determines whether or not the air-fuel ratio of the exhaust purification catalyst is on the rich side as compared with the predetermined value, based on an output value of a downstream-side air-fuel ratio detection device provided downstream of the exhaust purification catalyst.

* * * * *